US 6,414,717 B1

(12) United States Patent
Kondo et al.

(10) Patent No.: US 6,414,717 B1
(45) Date of Patent: Jul. 2, 2002

(54) PICTURE CONVERTING APPARATUS, PICTURE CONVERTING METHOD, LEARNING APPARATUS, LEARNING METHOD, AND RECORD MEDIUM

(75) Inventors: Tetsujiro Kondo, Tokyo; Naoki Kobayashi, Kanagawa; Kenji Takahashi, Kanagawa; Yoshinori Watanabe, Kanagawa, all of (JP)

(73) Assignee: Sony Corporation, Tokyo (JP)

( * ) Notice: Subject to any disclaimer, the term of this patent is extended or adjusted under 35 U.S.C. 154(b) by 209 days.

(21) Appl. No.: 09/585,874

(22) Filed: Jun. 1, 2000

Related U.S. Application Data

(63) Continuation of application No. PCT/JP99/05495, filed on Oct. 5, 1999.

(30) Foreign Application Priority Data

Oct. 5, 1998 (JP) .......................................... 10-282225

(51) Int. Cl.$^7$ ................................................ H04N 7/01
(52) U.S. Cl. ...................... 348/441; 348/458; 348/581; 348/409.1; 348/411.1; 348/425.2; 382/299; 375/240.21; 386/131
(58) Field of Search ................................ 348/441, 458, 348/459, 443, 445, 581, 404.1, 409.1, 411.1, 412.1, 425.1, 425.2; 382/298, 299, 300; 375/240.21, 240.26, 240.27; 386/131, 112; H04N 7/01, 7/32

(56) References Cited

U.S. PATENT DOCUMENTS

| | | | |
|---|---|---|---|
| 5,469,216 A | * 11/1995 | Takahashi et al. | ........... 348/441 |
| 5,732,157 A | * 3/1998 | Osawa | ......................... 382/244 |
| 5,912,708 A | 6/1999 | Kondo et al. | ............. 348/415.1 |
| 6,058,217 A | * 5/2000 | Kondo | ........................ 382/251 |
| 6,160,845 A | * 12/2000 | Kondo et al. | ................ 375/240 |

(List continued on next page.)

FOREIGN PATENT DOCUMENTS

| | | |
|---|---|---|
| EP | 0 820 195 | 1/1998 |
| EP | 0 820 198 | 1/1998 |
| EP | 0 825 776 | 2/1998 |
| EP | 0 891 101 | 1/1999 |
| JP | 7-95591 | 4/1995 |
| JP | 7-147681 | 6/1995 |
| JP | 9-186608 | 7/1997 |
| JP | 10-93963 | 4/1998 |

(List continued on next page.)

Primary Examiner—John W. Miller
Assistant Examiner—Jean W. Désir
(74) Attorney, Agent, or Firm—Frommer Lawrence & Haug LLP; William S. Frommer

(57) ABSTRACT

A picture reducing circuit 1 reduces a supplied original picture. An upper hierarchical level picture memory 2 stores an input upper hierarchical level picture. A predictive tap obtaining circuit 3 extracts a predictive tap from the upper hierarchical level picture stored in the upper hierarchical level picture memory 2 and outputs the extracted predictive tap to a predictive coefficient calculating circuit 4, a pixel value updating circuit 5, and a mapping circuit 6. The predictive coefficient calculating circuit 4 generates an observation equation using the predictive tap as student data and pixels of an original picture corresponding thereto as teacher data, solves the observation equation, and generates predictive coefficients. The pixel value updating circuit 5 generates an observation equation using the predictive coefficient as student data received from the predictive coefficient calculating circuit 4 and original picture data corresponding thereto as teacher data, solves the observation equation, and simultaneously obtains optimum values of a plurality of updated pixel values corresponding to given coefficients.

11 Claims, 13 Drawing Sheets

U.S. PATENT DOCUMENTS

| | | | | |
|---|---|---|---|---|
| 6,233,019 B1 | * | 5/2001 | Kondo et al. | 348/458 |
| 6,256,343 B1 | * | 7/2001 | Suzuki | 375/240 |
| 6,285,714 B1 | * | 9/2001 | Kawaguchi et al. | 375/240.21 |
| 6,311,328 B1 | * | 10/2001 | Miyazaki et al. | 725/37 |
| 6,330,344 B1 | * | 12/2001 | Kondo et al. | 382/107 |
| 6,339,615 B1 | * | 1/2002 | Kondo et al. | 375/240.14 |

FOREIGN PATENT DOCUMENTS

| | | |
|---|---|---|
| JP | 10-112844 | 4/1998 |
| JP | 10-210482 | 8/1998 |
| JP | 10-243405 | 9/1998 |
| JP | 10-243406 | 9/1998 |

* cited by examiner

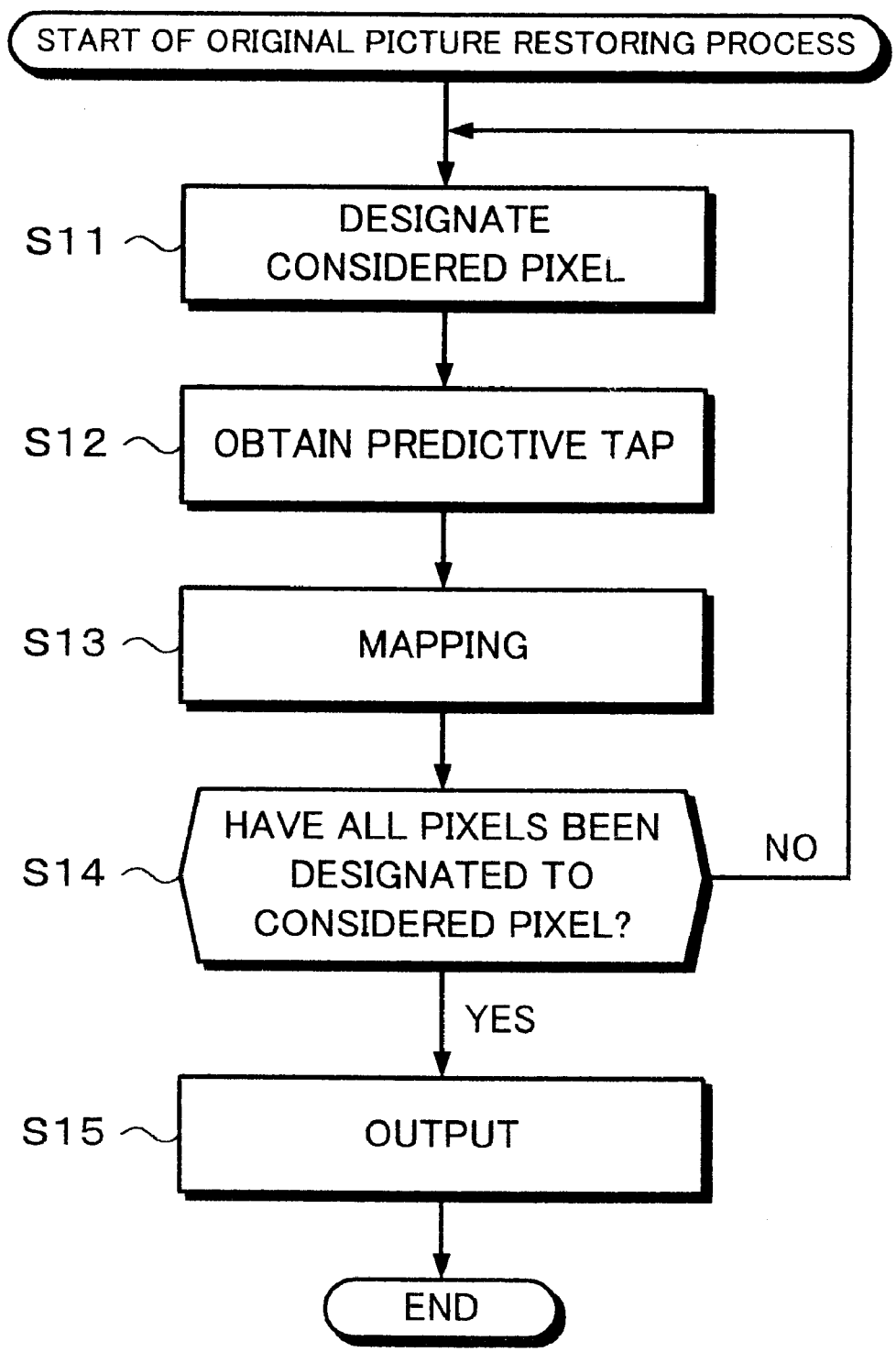

PICTURE CONVERTING APPARATUS, PICTURE CONVERTING METHOD, LEARNING APPARATUS, LEARNING METHOD, AND RECORD MEDIUM

This is a continuation of copending International Application PCT/JP99/05495 having an international filing date of Oct. 5, 1999.

TECHNICAL FIELD

The present invention relates to a picture converting apparatus, a picture converting method, a learning apparatus, a learning method, and a record medium, in particular, to those for generating a compressed picture from which an original picture can be restored.

RELATED ART

The inventor of the present invention has proposed a technology for generating a high resolution picture using a low resolution picture as disclosed in Japanese Patent Laid Open Publication No. 10-93980. According to the related art reference, using a low resolution picture of which a high resolution original picture is reduced, almost the same high resolution picture as the original picture can be restored. In the related art reference, as shown in FIG. 1, the pixel values of (3×3) pixels a to i that surround a pixel i of a high resolution picture (a restored picture) at the position corresponding to a considered pixel I of a low resolution picture (an upper hierarchical level picture) are obtained by calculating linear combinations of a plurality of pixels (for example, (3×3) pixels A to I) of the low resolution picture at the positions adjacent thereto and predetermined predictive coefficients. In addition, errors between the pixel values of the restored picture and the pixel values of the original picture are calculated. Corresponding to the calculated results, the pixel values of the low resolution picture and the predictive coefficients are repeatedly updated.

Conventionally, the pixel values of a low resolution picture are updated under the condition that the pixel values of pixels adjacent to each pixel are fixed. In other words, as shown in FIG. 1, the pixel value of the considered pixel I of the low resolution picture is updated to an optimal value under the condition that the pixel values of the eight pixels A to H that surround the considered pixel I and the values of the predetermined predictive coefficients are fixed.

Thus, after the pixel value of the pixel I is updated, if the pixel value of the pixel D is updated, since the pixel D is a pixel whose pixel value was fixed when the pixel value of the pixel I was updated, the pixel value of the pixel I that was updated is not optimum to the updated pixel D. Thus, when the pixel value of each pixel of the low resolution picture (an upper hierarchical level picture) is successively updated, the resultant low resolution picture (an upper hierarchical level picture) of which all the pixel values were finally updated is not always an optimum picture of which the original picture can be restored.

Although this problem can be solved by simultaneously updating the pixel values of a plurality of adjacent pixels of the low resolution picture (un upper hierarchical level picture) to optimum values, the number of calculations becomes huge. Thus, it takes a long time to perform such calculations. In addition, the scale of the calculating circuit becomes large. Consequently, such a method is substantially impossible.

The present invention is made from the above-mentioned point of view. An object of the present invention is to obtain a low resolution picture of which a high resolution picture almost similar to an original picture can be restored in a short time in such a manner that the pixel values of a plurality of adjacent pixels are simultaneously updated.

DISCLOSURE OF THE INVENTION

The invention of claim 1 is a picture data converting apparatus for converting first picture data into second picture data whose picture quality is lower than the first picture data, comprising:

an intermediate picture data generating portion for generating intermediate picture data whose picture quality is almost the same as the second picture data from the first picture data;

a storing portion for storing the intermediate picture data;

a block extracting portion for extracting a plurality of pixel data for each block which is part of one screen from the intermediate picture data;

a predictive coefficient generating portion for outputting generated or pre-obtained predictive coefficients;

a pixel value updating portion for updating the pixel values of the pixels of the intermediate picture data extracted by the block extracting portion according to the predictive coefficients, the intermediate picture data, and the first picture data;

a predictive picture data generating portion for generating predictive picture data whose picture quality is almost the same as the first picture data according to the intermediate picture data whose pixel values are updated by the pixel value updating portion and the predictive coefficients;

an error detecting portion for detecting an error between the first picture data and the predictive picture data; and a controlling portion for deciding whether or not the intermediate picture data is used as an output picture according to the error.

The invention of claim 6 is a picture data converting method for converting first picture data into second picture data whose picture quality is lower than the first picture data, comprising the steps of:

generating intermediate picture data whose picture quality is almost the same as the second picture data from the first picture data;

extracting a plurality of pixel data for each block which is part of one screen from the intermediate picture data;

outputting generated or pre-obtained predictive coefficients;

updating the pixel values of the pixels of the intermediate picture data extracted at the block extracting portion according to the predictive coefficients, the intermediate picture data, and the first picture data;

generating predictive picture data whose picture quality is almost the same as the first picture data according to the intermediate picture data whose pixel values are updated and the predictive coefficients;

detecting an error between the first picture data and the predictive picture data; and deciding whether or not the intermediate picture data is used as an output picture according to the error.

The invention of claim 11 is a learning apparatus for learning pixel values of second picture data when converting first picture data into the second picture data whose picture quality is lower than the first picture data, comprising:

an intermediate picture data generating portion for generating intermediate picture data whose picture quality is almost the same as the second picture data from the first picture data;

a storing portion for storing the intermediate picture data;

a block extracting portion for extracting a plurality of pixel data for each block which is part of one screen from the intermediate picture data;

a predictive coefficient generating portion for outputting generated or pre-obtained predictive coefficients;

a pixel value updating portion for updating the pixel values of the intermediate picture data extracted by the block extracting portion according to the predictive coefficients, the intermediate picture data, and the first picture data;

a predictive picture data generating portion for generating predictive picture data whose picture quality is almost the same as the first picture data according to the intermediate picture data whose pixel values are updated by the pixel value updating portion and the predictive coefficients;

an error detecting portion for detecting an error between the first picture data and the predictive picture data; and a controlling portion for deciding whether or not the intermediate picture data is used as an output picture according to the error.

wherein the pixel value updating portion updates the pixel values of the intermediate picture data using the method of least squares with the predictive coefficients as student data and the first pixel data corresponding thereto as teacher data.

The invention of claim 12 is a learning method for learning the pixel values of second picture data when converting first picture data into the second picture data whose picture quality is lower than the first picture data, comprising the steps of:

generating intermediate picture data whose picture quality is almost the same as the second picture data from the first picture data;

extracting data of a plurality of pixel data for each block which is part of one screen from the intermediate picture data;

outputting generated or pre-obtained predictive coefficients;

updating the pixel values of the extracted intermediate picture data according to the predictive coefficients, the intermediate picture data, and the first picture data;

generating predictive picture data whose picture quality is almost the same as the first picture data according to the intermediate picture data whose pixel values are updated and the predictive coefficients;

detecting an error between the first picture data and the predictive picture data; and deciding whether or not the intermediate picture data is used as an output picture according to the error, wherein the step for updating pixel value is performed by updating the pixel values of the intermediate picture data using the method of least squares with the predictive coefficients as student data and the first pixel data corresponding thereto as teacher data.

The invention of claim 13 is a record medium on which a computer controllable program for converting first picture data into second picture data whose picture quality is lower than the first picture data is recorded, the program comprising the steps of:

generating intermediate picture data whose picture quality is almost the same as the second picture data from the first picture data;

extracting a plurality of pixel data for each block which is part of one screen from the intermediate picture data;

generating predictive coefficients according to the extracted intermediate picture and the first picture data at the position corresponding thereto;

updating the pixel values of the extracted intermediate picture data according to the predictive coefficients, the intermediate picture data, and the first picture data;

generating predictive picture data whose picture quality is almost the same as the first picture data according to the intermediate picture data whose pixel values are updated and the predictive coefficients;

detecting an error between the first picture data and the predictive picture data; and deciding whether or not the intermediate picture data is used as an output picture according to the error.

BRIEF DESCRIPTION OF DRAWINGS

FIG. 14 is a flow chart for explaining an original picture restoring process of the decoder shown in FIG. 13.

BEST MODES FOR CARRYING OUT THE INVENTION

Figure 2:
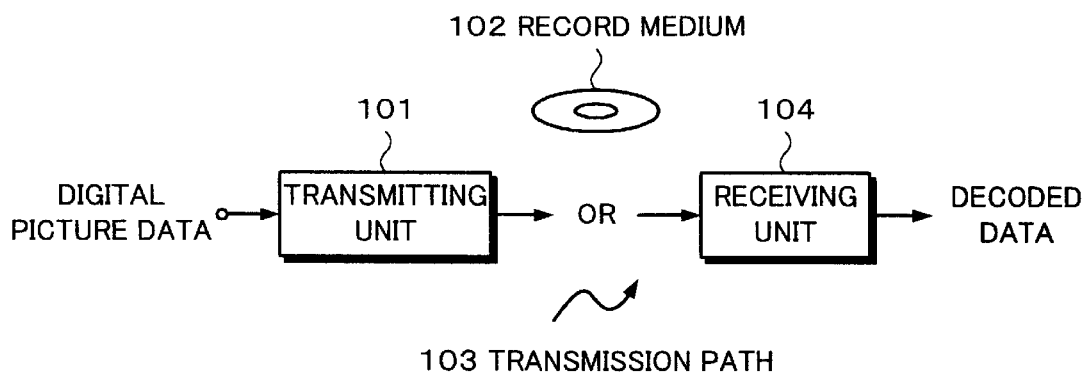
FIG. 2 is a block diagram showing the overall structure of a picture data converting apparatus according to the present invention.

Next, embodiments of the present invention will be described. FIG. 2 is a block diagram showing the structure of a picture processing apparatus according to an embodiment of the present invention.

Digital picture data is supplied to a transmitting unit 101. The transmitting unit 101 calculates the average value of each block of a plurality of pixels of the input picture data. Thus, by substituting pixel values of the plurality of pixels into an average value, the transmitting unit 101 compresses the picture data. The transmitting unit 101 records the compressed data (encoded data) to a record medium 102 such as an optical disc or a magnetic tape. Alternatively, the transmitting unit 101 transmits the encoded data through a transmission path 103 such as broadcast line (satellite broadcast or the like), a telephone line, or Internet.

A receiving unit 104 reproduces encoded data recorded on the record medium 102. Alternatively, the receiving unit 104 receives encoded data through the transmission path 103 and decodes the encoded data. In other words, the receiving apparatus restores thinned-out pixel values. The decoded picture obtained by the receiving unit 104 is supplied to a display unit (not shown). The display unit displays the decoded picture.

Figure 3:
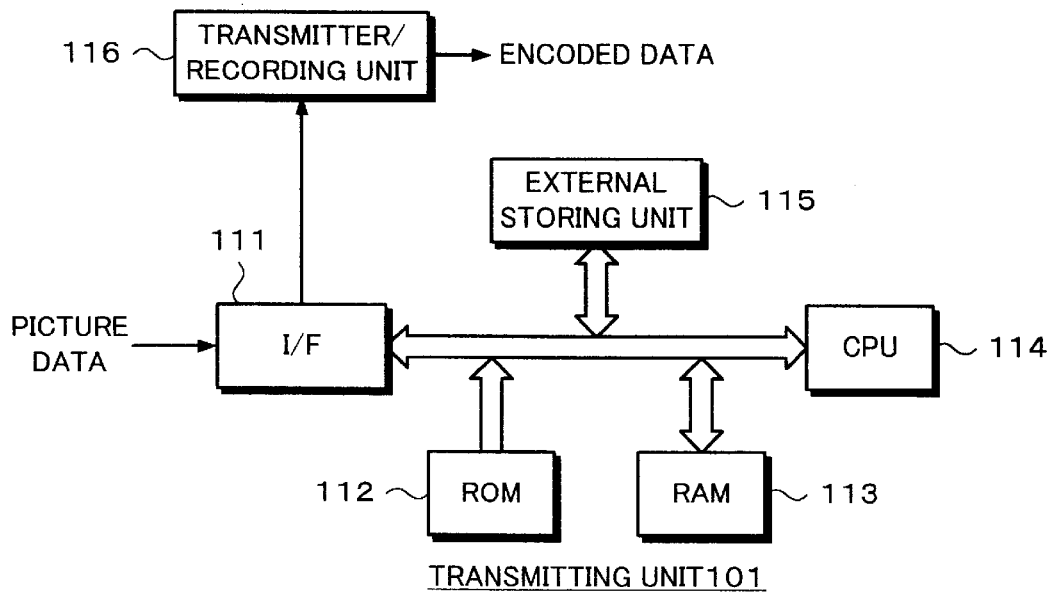
FIG. 3 is a block diagram showing an example of the functional structure of a transmitting unit shown in FIG. 2.

FIG. 3 is a block diagram showing an example of the structure of the transmitting unit 101. In FIG. 3, an I/F (interface) 111 performs a receiving process of picture data supplied from the outside of the transmitting unit 101 and a transmitting process for transmitting encoded data to a transmitter/recording unit 116. A ROM 112 stores a program such as an IPL (Initial Program Loading) program. A RAM 113 stores a system program (OS: Operating System) and an application program. In addition, the RAM 113 stores data necessary for operating a CPU 114.

The CPU 114 loads the system program and the application program stored in the external storing unit 115 to the RAM 113 corresponding to the IPL program stored in the ROM 112 and executes the application program under the control of the system program. In other words, the CPU 114 performs an encoding process for picture data supplied from the interface 111. The encoding process will be described later.

The external storing unit 115 is for example a hard disk. The eternal storing unit 115 stores the system program, the application program, and data. The transmitter/storing unit 116 records the encoded data supplied from the interface 111 to the record medium 102. Alternatively, the transmitter/storing unit 116 transmits the encoded data through the transmission path 103. The interface 111, the ROM 112, the RAM 113, the CPU 114, and the external storing unit 115 are mutually connected through a bus.

In the transmitting unit 101, when picture data is supplied to the interface 111, the picture data is supplied to the CPU 114. The CPU 114 encodes the picture data and supplies the resultant encoded data to the interface 111. The interface 111 records the encoded data to the record medium 102 or transmits it to the transmission path 103 through the transmitter/storing unit 116.

Figure 4:
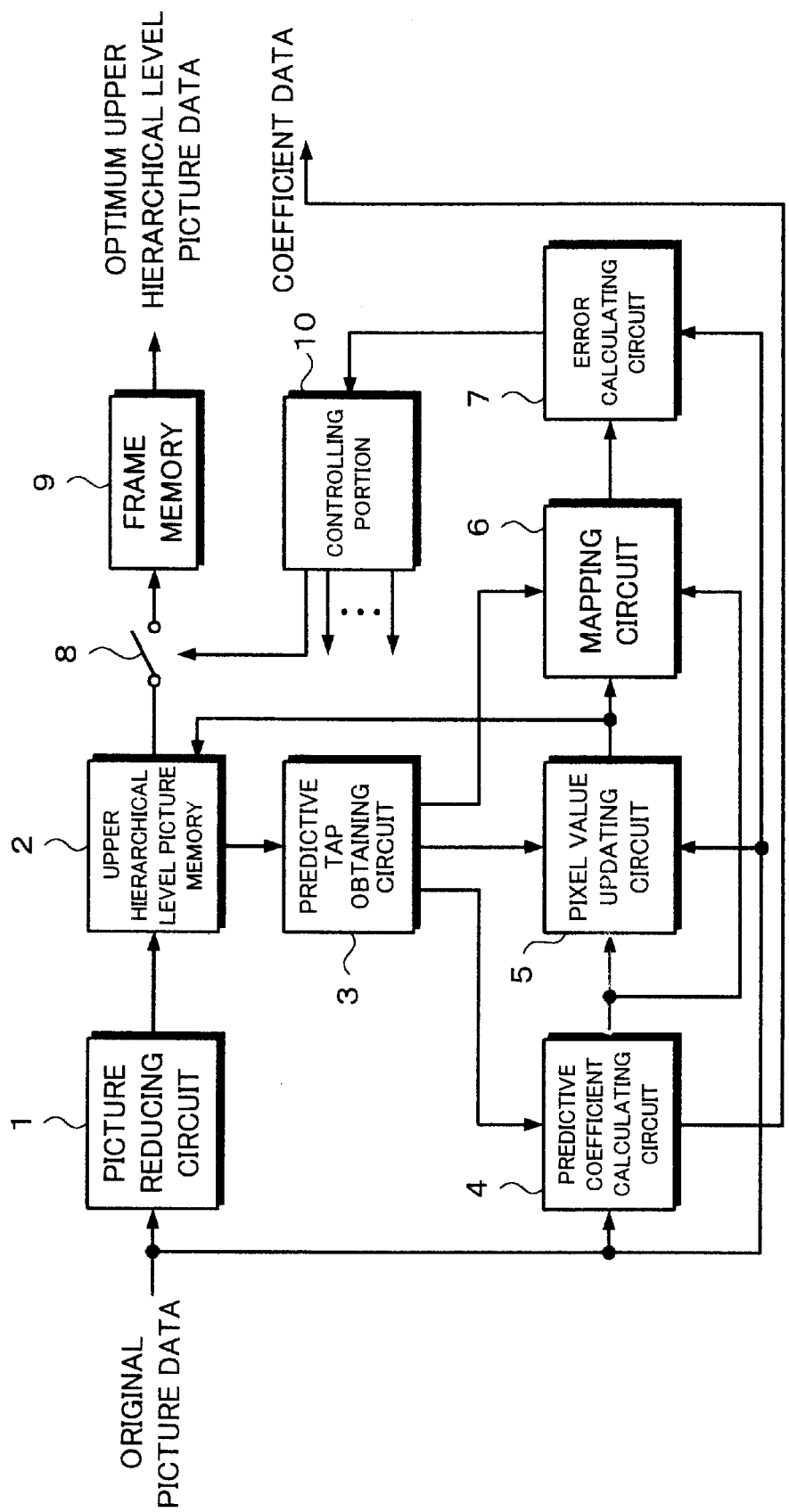
FIG. 4 is a block diagram showing an example of the structure of an encoder according to the present invention.

FIG. 4 shows the functional structure of a circuit block (encoder) of the transmitting unit 101 excluding the transmitter/recording unit 116 shown in FIG. 3. The encoder can be accomplished by hardware, software, or a combination thereof. For example, by loading a record medium storing an encoding program shown in a flow chart that follows to a drive, the program can be installed to the external storing unit 115 and the function of the encoder can be accomplished.

An example of the record medium that stores the computer program for the above-described process is a magnetic disk, a CD-ROM, and a fixed memory. Alternatively, a communication medium such as a network or satellite can be used.

Figure 1:
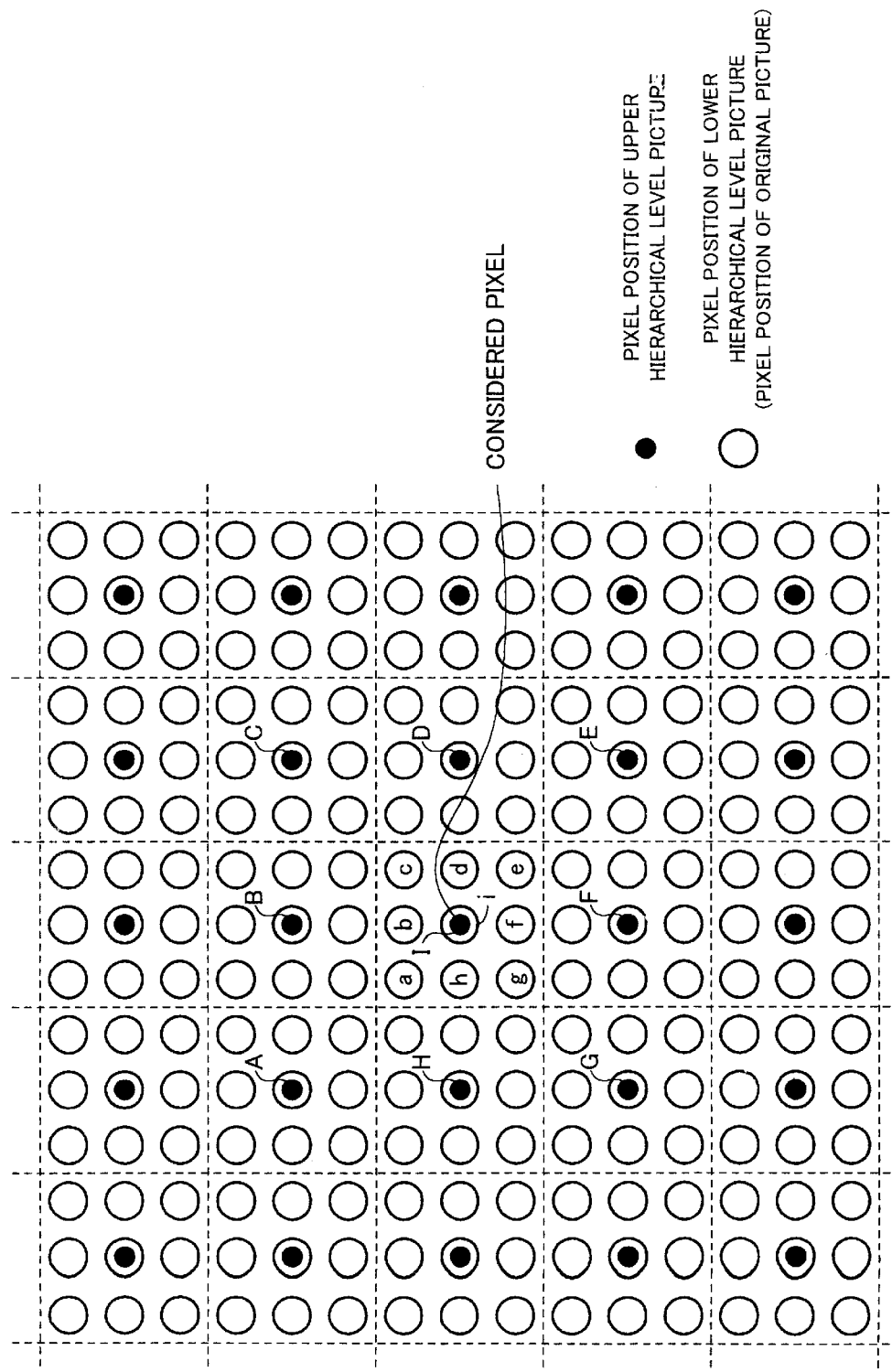
FIG. 1 is a schematic diagram showing an arrangement of pixels for explaining a proposed encoding method.

In the encoder shown in FIG. 4, input original picture data is supplied to a picture reducing circuit 1, a predictive coefficient calculating circuit 4, a pixel value updating circuit 5, and an error calculating circuit 7. As shown in FIG. 1, the picture reducing circuit 1 divides the supplied original picture (high resolution picture) into blocks each of which is composed of 3×3 pixels, generates an initial upper level hierarchical picture of which the average value of pixel values of nine pixels of each block is placed at the center of each block, and outputs the initial upper hierarchical level picture to an upper hierarchical level picture memory 2. Thus, the size of the upper hierarchical level picture is reduced ⅓ the size of the original picture in each of the vertical direction and the horizontal direction.

When the initial upper hierarchical level picture is formed, the pixel value at the center of each block, the middle value of the pixel values of each block, the majority value of each block, or a pixel that is thinned out may be used instead of the average value of each block.

The upper hierarchical level picture memory 2 stores the upper hierarchical level picture that is input from the picture reducing circuit 1. The upper hierarchical level picture memory 2 updates the pixel values of the upper hierarchical picture using pixel values that,are input from the pixel value updating circuit 5. In addition, the upper hierarchical level picture memory 2 outputs the stored upper hierarchical level picture data to a frame memory 9 through a switch.

A predictive tap obtaining circuit 3 successively designates each pixel of the upper hierarchical level picture stored in the upper hierarchical level picture memory 2 to a considered pixel and supplies the pixel values of the considered pixel and the adjacent pixels thereof to the predictive coefficient calculating circuit 4, the pixel value updating circuit 5, and a mapping circuit 6.

Figure 5:
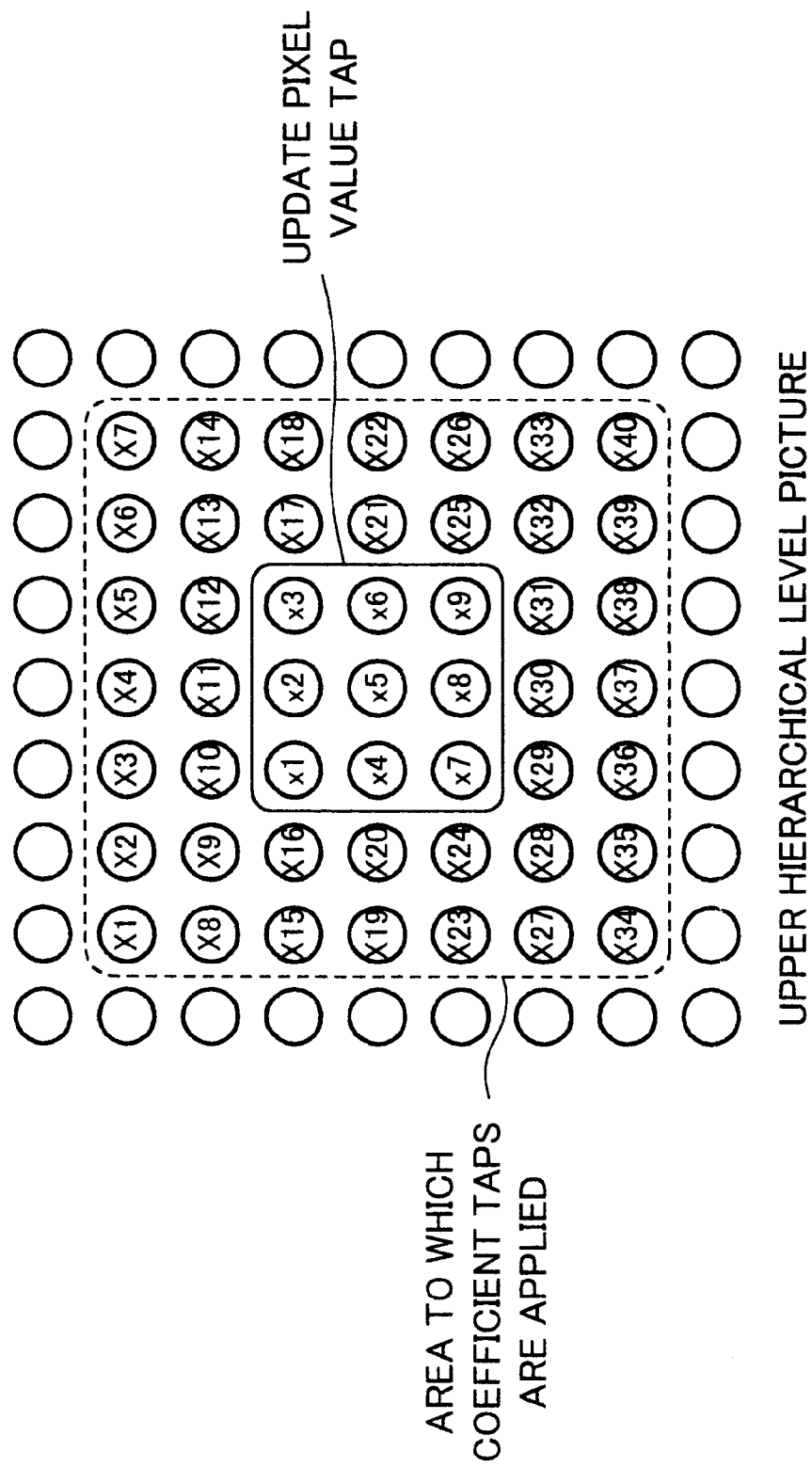
FIG. 5 is a schematic diagram for explaining a process of a predictive tap obtaining circuit 3 shown in FIG. 4.

For simplicity, as shown in FIG. 5, it is assumed that the size of each update pixel value block (a predictive tap) is (3×3) pixels and the size of a predictive coefficient tap is (3×3) pixels. The update pixel value block (predictive tap) represents a block composed of a plurality of pixels extracted for predicting a particular pixel. On the other hand, the predictive coefficient tap represents a group of a plurality of coefficients used for predicting a particular pixel. In FIG. 5, x represents a pixel to be updated; X represents a pixel whose pixel value is fixed; c (that will be described later) represents a coefficient; Y' represents a predictive value; and Y represents a pixel value of a pixel of the original picture.

For example, when a pixel x5 shown in FIG. 5 is designated to a considered pixel, a predictive tap composed of (3×3) pixels (pixels x1 to x9) that surround the considered pixel x5 is supplied to the predictive coefficient calculating circuit 4. On the other hand, all predictive taps ((7×7) pixels that surround the considered pixel x5 in an area represented by a dotted line shown in FIG. 5) that contains at least one of (3×3) pixels that surround the considered pixel x5 is supplied to the pixel value updating circuit 5. 40 (=49−9) pixels (pixels X1 to X40) excluding (3×3) pixels that surround the considered pixel x5 of the (7×7) pixels that surround the considered pixel x5 are supplied to the mapping circuit 6.

Figure 6:
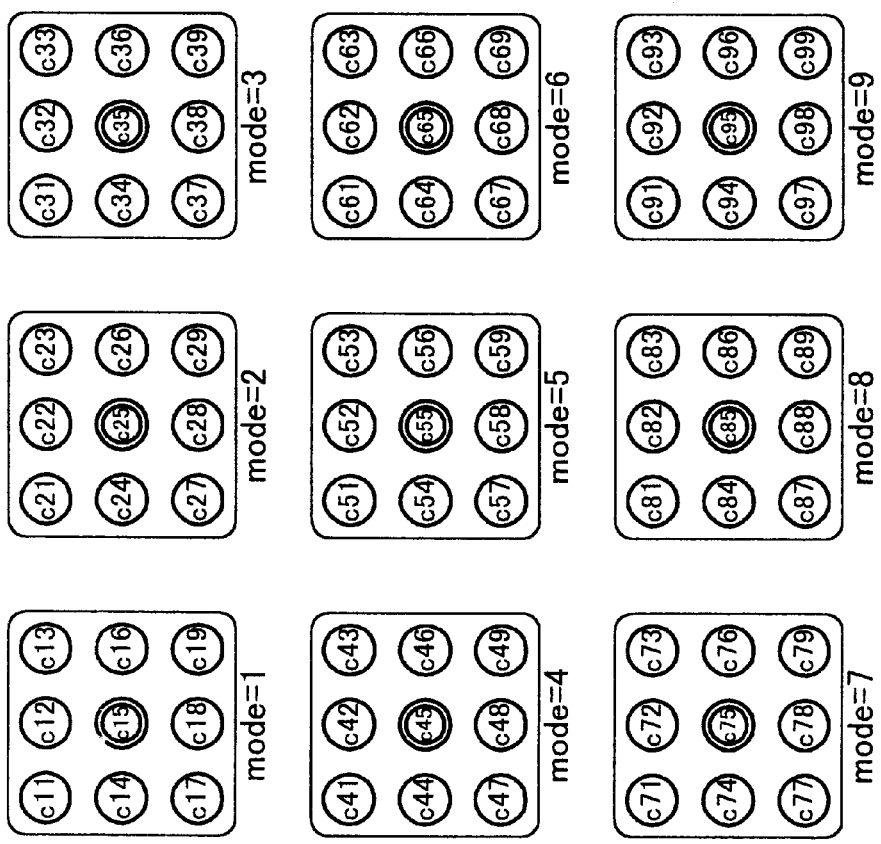
FIG. 6 is a schematic diagram for explaining predictive coefficient taps.

The predictive coefficient calculating circuit 4 generates an observation equation using the predictive tap (pixels x1 to x9) that surround the considered pixel x5 as learning data (student data) (the predictive tap is supplied from the predictive tap obtaining circuit 3) and pixels (corresponding to the predictive tap) of the original picture as teacher data and solves the observation equation using the method of least squares. Thus, the predictive coefficient calculating circuit 4 calculates predictive coefficients for nine modes (mode 1 to mode 9) shown in FIG. 6 and supplies the predictive coefficients to the pixel value updating circuit 5 and the mapping circuit 6.

The predictive coefficient tap of each mode composed of (3×3) predictive coefficients is used to predict the pixel values of (3×3) pixels that surround a pixel of the lower hierarchical level picture corresponding to the considered pixel.

In more reality, in the pixel arrangement shown in FIG. 1, a predictive coefficient tap used for predicting the pixel a is a predictive coefficient tap of mode 1. A predictive coefficient tap used for predicting the pixel b is a predictive coefficient tap of mode 2. A predictive coefficient tap used for predicting the pixel c is a predictive coefficient tap of mode 3. A predictive coefficient tap used for predicting the pixel h is a predictive coefficient tap of mode 4. A predictive coefficient tap used for predicting the pixel i is a predictive coefficient tap of mode 5. A predictive coefficient tap used for predicting the pixel d is a predictive coefficient tap of mode 6. A predictive coefficient tap used for predicting the pixel g is a predictive coefficient tap of mode 7. A predictive coefficient tap used for predicting the pixel f is a predictive coefficient tap of mode 8. A predictive coefficient tap used for predicting the pixel e is a predictive coefficient tap of mode 9.

Figure 7:
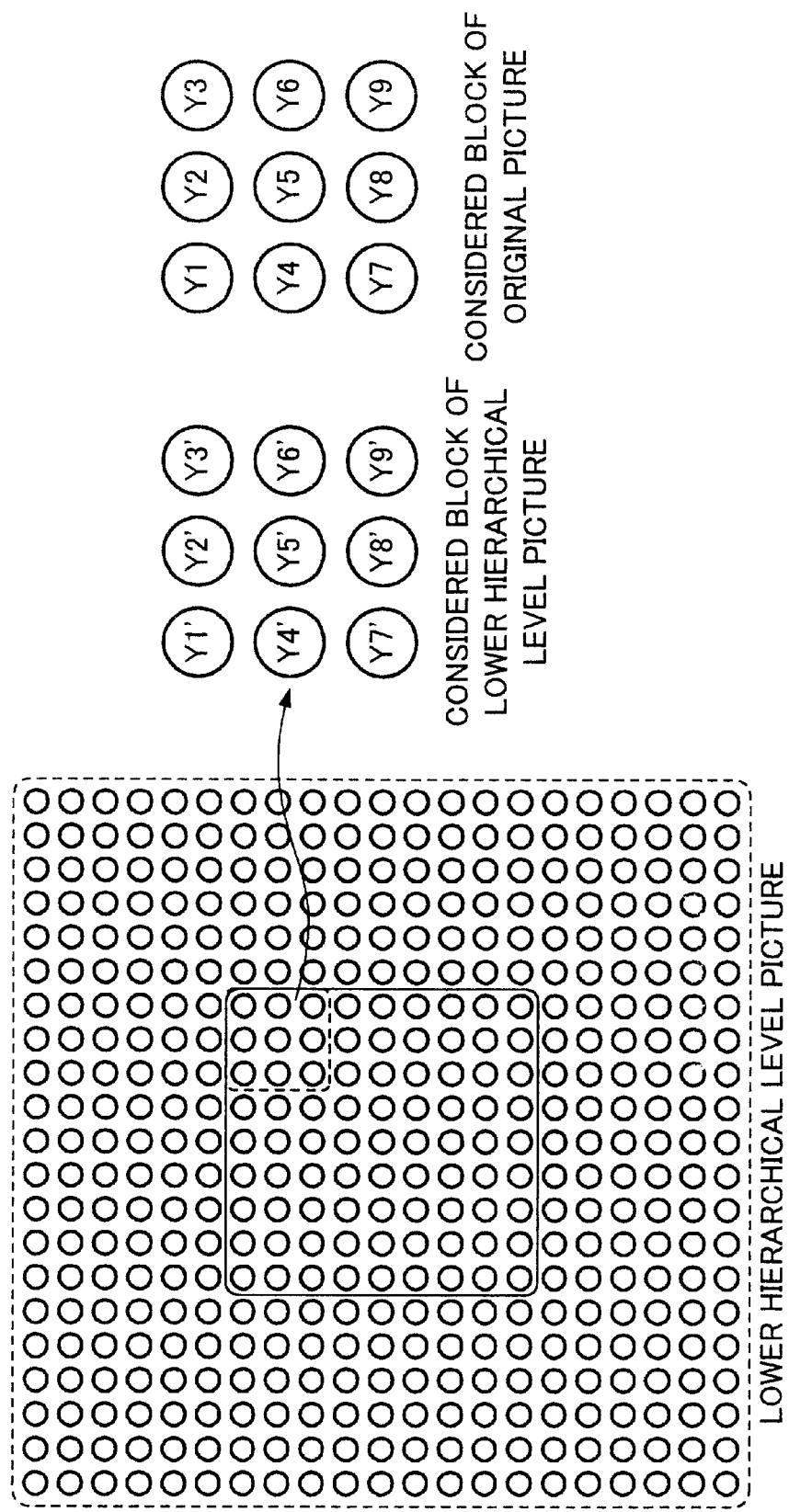
FIG. 7 is a schematic diagram for explaining a lower hierarchical level picture.

FIG. 7A shows a lower hierarchical level picture predicted with the upper hierarchical level picture shown in FIG. 5. For example, by calculating linear combinations of the predictive coefficient tap of mode 1 (predictive coefficients c11 to c19) and the pixel values of pixels (pixels X11, X12, X13, x2, x3, X17, x5, x6, and X21) that compose a predictive tap that surrounds the pixel x3, the pixel value of a pixel (the pixel Y1' shown in FIG. 7B) at the upper left position of a pixel (a pixel Y5' shown in FIG. 7B) of the lower hierarchical level picture corresponding to the considered pixel is obtained. In addition, by calculating linear combinations of the predictive coefficient tap of mode 9 (predictive coefficients c91 to c99) and the pixel values of pixels that compose a predictive tap that surrounds the pixel x3, the pixel value of a pixel (a pixel Y9' shown in FIG. 7B) at the lower right position of a pixel of the lower hierarchical level picture corresponding to the considered pixel is obtained.

The pixel value updating circuit 5 simultaneously updates the pixel values of (3×3) pixels that surround a considered pixel and supplies the updated pixel values to the upper hierarchical level picture memory 2 and the mapping circuit 6.

Figure 8:
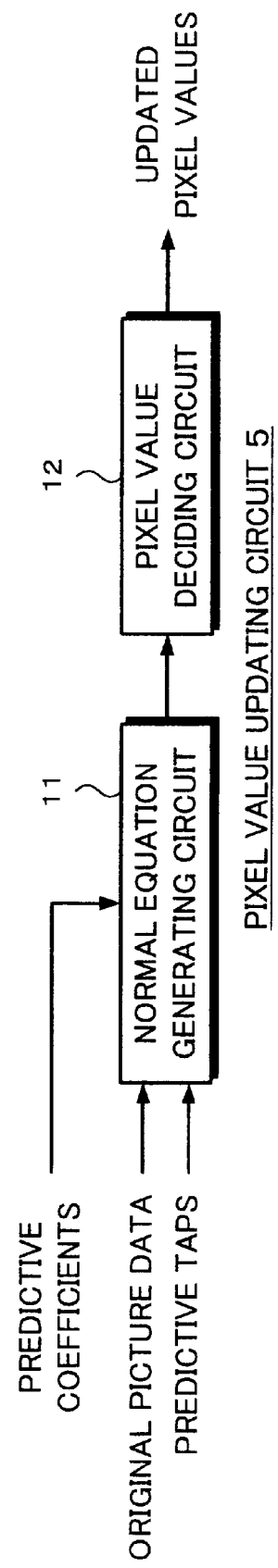
FIG. 8 is a block diagram showing an example of the structure of a pixel value updating circuit 5 shown in FIG. 4.

FIG. 8 shows an example of the structure of the pixel value updating circuit 5. A normal equation generating circuit 11 generates a normal equation with predictive values and real values (pixel values of the original picture) of predictive coefficients that are input from the predictive coefficient calculating circuit 4, the pixel values of pixels that compose a predictive tap that is input from the predictive tap obtaining circuit 3, and the pixel values of the original picture corresponding to the predict tape and outputs the normal equation to the pixel value deciding circuit 12. The pixel value deciding circuit 12 simultaneously calculates the pixel values (updated values) of (3×3) pixels that surround a considered pixel of the upper hierarchical level picture so as to minimize errors between the predictive values and the real values using the input normal equation. Hereinafter, nine pixels that are simultaneously updated are referred to as update pixel value tap.

Next, the normal equation that is generated by the normal equation generating circuit 11 will be described. The normal equation is generated with the pixel values of pixels of which an update pixel value tap and a predictive coefficient tap overlap. For example, when the pixel values of (3×3) pixels (pixels x1 to x9) that surround the pixel x5 shown in FIG. 5 are updated (as update pixel value tap), the pixel values of the pixels (pixels X1 to X40) except for the update pixel value tap in the area represented by the dotted line and all the predictive coefficients c11 to c99, are fixed. The predictive coefficient tap is moved in the area represented by the dotted line so as to predict the pixel values of pixels of the lower hierarchical level picture.

When the center of the predictive coefficient tap is moved to the position overlying with the pixel x3, the pixel value (predictive value) of the pixel Y1' at the upper left position of the pixel Y5' of the lower hierarchical level picture corresponding to the pixel x3 is obtained by calculating linear combinations of the predictive coefficient tap of mode 1 (predictive coefficients c11 to c19) and the pixel values of (3×3) pixels (pixels X11, X12, X13, x2, x3, X17, x5, x6, and X21) that surround the pixel x3. The pixel value Y1' can be expressed by formula (1).

$$Y1'=c11X11+c12X12+c13X13+c14x2+c15x3+c16X17+c17x5+c18x6+c19X21 \quad (1)$$

Likewise, when the pixel values Y2' to Y9' are represented by linear combinations of predictive coefficients and the pixel values of pixels of the upper hierarchical level picture and the obtained nine expressions are rewritten with a matrix, the following observation equation is satisfied.

$$Y'=cX$$

where Y' represents a matrix as a set of the pixel values Y1' to Y9'; c represents a matrix as a set of the predictive coefficients c11 to c99; and X represents a matrix as a set of pixel values of an upper hierarchical level picture.

Next, applying the method of least squares to the observation equation, predictive values Y' similar to pixel values of pixels of the original picture are obtained.

Considering formula (1) as an origin of the observation equation, the difference between the predictive value Y1 and the pixel value Y1 of the original picture corresponding thereto is represented by formula (2).

$$Y1-Y1'=Y1-(c11X11+c12X12+c13X13+c14x2+c15x3+c16X17+c17x5+c18x6+c19X21) \quad (2)$$

The right side of formula (2) can be arranged to formula (3).

$$Y1-Y1'=Y1-(c11X11+c12X12+c13X13+c16X17+c19X21)-(c14x2+c15x3+c17x5+c18x6) \quad (3)$$

The difference between the predictive value Y1' and the relevant pixel value Y1 of the original picture corresponding thereto (namely, the left side of formula (3)) is referred to as residual. By moving the constant terms of the right side to the left side of formula (3) and arranging the resultant equation, formula (4) is obtained.

$$Y1-(c11X11+c12X12+c13X13+c16X17+c19X21)+e1=(c14x2+c15x3+c17x5+c18x6) \quad (4)$$

In addition, using predictive coefficient taps for other modes (mode 2 to mode 9), with Yn−Yn' (where n is 2 to 9), formulas (5) to (12) that are similar to formula (4) are obtained.

$$Y2-(c21X11+c22X12+c23X13+c26X17+c29X21)+e2=(c24x2+c25x3+c27x5+c28x6) \quad (5)$$

$$Y3-(c31X11+c32X12+c33X13+c36X17+c39X21)+e3=(c34x2+c35x3+c37x5+c38x6) \quad (6)$$

$$Y4-(c41X11+c42X12+c43X13+c46X17+c49X21)+e4=(c44x2+c45x3+c47x5+c48x6) \quad (7)$$

$$Y5-(c51X11+c52X12+c53X13+c56X17+c59X21)+e5=(c54x2+c55x3+c57x5+c58x6) \quad (8)$$

$$Y6-(c61X11+c62X12+c63X13+c66X17+c69X21)+e6=(c64x2+c65x3+c67x5+c68x6) \quad (9)$$

$$Y7-(c71X11+c72X12+c73X13+c76X17+c79X21)+e7=(c7x2+c75x3+c77x5+c78x6) \quad (10)$$

$$Y8-(c81X11+c82X12+c83X13+c86X17+c89X21)+e8=(c84x2+c85x3+c87x5+c88x6) \quad (11)$$

$$Y9-(c91X11+c92X12+c93X13+c96X17+c99X21)+e9=(c94x2+c95x3+c97x5+c98x6) \quad (12)$$

Likewise, the predictive coefficient tap is moved in the area represented by the dotted line shown in FIG. 5. In other words, the center of the predictive coefficient tap is moved so that the tap successively overlays with all pixels (25 pixels) in the square area formed with the pixels X9, X13, X28, and X32. With all the predictive coefficient taps of nine modes, 225 (=9×25) expressions similar to formulas (4) to (12) are obtained.

When the 225 expressions are expressed by a matrix, a residual equation in the form of [teacher data]+[residual e]=[learning data c]×[predictive pixel values x] is obtained as expressed by formula (13).

$$\begin{aligned}
Y_1 - (c_{11}X_{11} + c_{12}X_{12} + c_{13}X_{13} + c_{16}X_{17} + c_{19}X_{21}) \quad e_{k+1} \\
Y_2 - (c_{21}X_{11} + c_{22}X_{12} + c_{23}X_{13} + c_{26}X_{17} + c_{29}X_{21}) \quad e_{k+2} \\
Y_3 - (c_{31}X_{11} + c_{32}X_{12} + c_{33}X_{13} + c_{36}X_{17} + c_{39}X_{21}) \quad e_{k+3} \\
Y_4 - (c_{41}X_{11} + c_{42}X_{12} + c_{43}X_{13} + c_{46}X_{17} + c_{49}X_{21}) \quad e_{k+4} \\
Y_5 - (c_{51}X_{11} + c_{52}X_{12} + c_{53}X_{13} + c_{56}X_{17} + c_{59}X_{21}) \quad e_{k+5} \\
Y_6 - (c_{61}X_{11} + c_{62}X_{12} + c_{63}X_{13} + c_{66}X_{17} + c_{69}X_{21}) \quad e_{k+6} \\
Y_7 - (c_{71}X_{11} + c_{72}X_{12} + c_{73}X_{13} + c_{76}X_{17} + c_{79}X_{21}) \quad e_{k+7} \\
Y_8 - (c_{81}X_{11} + c_{82}X_{12} + c_{83}X_{13} + c_{86}X_{17} + c_{89}X_{21}) \quad e_{k+8} \\
Y_9 - (c_{91}X_{11} + c_{92}X_{12} - c_{93}X_{13} + c_{96}X_{17} + c_{99}X_{21}) \quad e_{k+9}
\end{aligned} \quad (13)$$

$$\begin{bmatrix}
0 & c_{14} & c_{15} & 0 & c_{17} & c_{18} & 0 & 0 & 0 \\
0 & c_{24} & c_{25} & 0 & c_{27} & c_{28} & 0 & 0 & 0 \\
0 & c_{34} & c_{35} & 0 & c_{37} & c_{38} & 0 & 0 & 0 \\
0 & c_{44} & c_{45} & 0 & c_{47} & c_{48} & 0 & 0 & 0 \\
0 & c_{54} & c_{55} & 0 & c_{57} & c_{58} & 0 & 0 & 0 \\
0 & c_{64} & c_{65} & 0 & c_{67} & c_{68} & 0 & 0 & 0 \\
0 & c_{74} & c_{75} & 0 & c_{77} & c_{78} & 0 & 0 & 0 \\
0 & c_{84} & c_{85} & 0 & c_{87} & c_{88} & 0 & 0 & 0 \\
0 & c_{94} & c_{95} & 0 & c_{97} & c_{98} & 0 & 0 & 0
\end{bmatrix}
\begin{bmatrix} x_1 \\ x_2 \\ x_3 \\ x_4 \\ x_5 \\ x_6 \\ x_7 \\ x_8 \\ x_9 \end{bmatrix} =$$

$$\begin{bmatrix}
a_{11} & a_{12} & .. & a_{19} \\
a_{12} & a_{22} & .. & a_{29} \\
.. & .. & .. & .. \\
a_{m1} & a_{m2} & .. & a_{m9}
\end{bmatrix}
\begin{bmatrix} X1 \\ X2 \\ X3 \\ X4 \\ X5 \\ X6 \\ X7 \\ X8 \\ X9 \end{bmatrix}$$

For simplicity, formula (13) represents only a portion with respect to formulas (4) to (12). aij (where i=1, 2, . . . , m (=255) and j=1, 2, . . . , 9) is equal to .data of row i, column j of matrix [learning data c].

In this case, predictive pixel values xi for obtaining predictive values Y' similar to pixel values Y of the original picture are obtained by minimizing a square error given by formula (14).

$$\sum_{i=1}^{m} e_i^2 \quad (14)$$

Thus, when the square error differentiated by the predictive pixel values xi becomes 0 (namely, when the predictive pixel values xi satisfy formula (15)), the predictive pixel values xi become optimum values for obtaining predictive values Y' close to pixel values Y of the original picture.

$$e_1 \frac{\partial e_1}{\partial x_i} + e_2 \frac{\partial e_2}{\partial x_i} + e_m \frac{\partial e_m}{\partial x_i} = 0 \; (i = 1, 2, \ldots 9) \quad (15)$$

By differentiating formula (13) with respect to predictive pixel values xi, the following formula is satisfied.

$$\frac{\partial e_i}{\partial x_1} = a_{i1}, \frac{\partial e_i}{\partial x_2} = a_{i2}, \ldots, \frac{\partial e_i}{\partial x_9} = a_{i9} \quad (16)$$

$$(i = 1, 2, \ldots, m)$$

With formulas (14), (15), and (16), formula (17) is obtained.

$$\sum_{i=1}^{m} e_i a_{i1} = 0, \sum_{i=1}^{m} e_i a_{i2} = 0, \sum_{i=1}^{m} e_i a_{i9} = 0 \quad (17)$$

In addition, denoting the teacher data (pixel values Y of the original picture-constant terms) of formula (13) by Y" and considering the relation of teacher data Y", predictive coefficients c, predictive pixel values x, and residual e, from formula (17), normal equations given by formula (18) can be obtained.

$$\left(\sum_{i=1}^{m} a_{i1}a_{i1}\right)x_1 + \left(\sum_{i=1}^{m} a_{i1}a_{i2}\right)x_2 + \ldots + \left(\sum_{i=1}^{m} a_{i1}a_{i9}\right)x_9 = \left(\sum_{i=1}^{m} a_{i1}Y_i^n\right)$$

$$\left(\sum_{i=1}^{m} a_{i2}a_{i1}\right)x_1 + \left(\sum_{i=1}^{m} a_{i2}a_{i2}\right)x_2 + \ldots + \left(\sum_{i=1}^{m} a_{i2}a_{i9}\right)x_9 = \left(\sum_{i=1}^{m} a_{i2}Y_i^n\right)$$

$$\ldots$$

$$\left(\sum_{i=1}^{m} a_{i9}a_{i1}\right)x_1 + \left(\sum_{i=1}^{m} a_{i9}a_{i2}\right)x_2 + \ldots + \left(\sum_{i=1}^{m} a_{i9}a_{i9}\right)x_9 = \left(\sum_{i=1}^{m} a_{i9}Y_i^n\right) \quad (18)$$

By solving the obtained normal equations using for example sweep-out method (Gauss-Jordan's elimination method), optimum pixel values of the update pixel value tap corresponding to the predictive coefficient tap supplied from the predictive coefficient calculating circuit 4 can be obtained.

Returning to FIG. 4, the mapping circuit 6 calculates linear combinations of the pixel values of the nine pixels of the update pixel value tap (that surrounds the considered pixel) supplied from the pixel value updating circuit 5, the pixel values of the 40 pixels (excluding the (3×3) pixels that surround the considered pixel from the (7×7) pixels that surround the considered pixel) supplied from the predictive tap obtaining circuit 3, and the predictive coefficients of the predictive coefficient taps (for the nine modes) that are input from the predictive coefficient calculating circuit 4 so as to partly local-decode the pixel values of the lower hierarchical level picture (namely, the range of which pixels of the update pixel value tap are affected). The local-decoded pixel values of the lower hierarchical level picture are supplied to the error calculating circuit 7.

The error calculating circuit 7 calculates errors between the pixel values of pixels of the lower hierarchical level picture local-decoded by the mapping circuit 6 and the pixel values of pixels of the original picture corresponding thereto. In the following description, as errors, S/N is used (where S/N=20 $\log_{10}$ (255/err) (err: standard deviation of errors). When S/N is equal to or larger than a predetermined threshold value, the error calculating circuit 7 determines that optimum pixels have been generated and a switch 8 is turned on. In this case, instead of evaluating S/N with a partially local-decoded picture, S/N may be evaluated for the entire picture.

The frame memory 9 stores a partly optimized upper hierarchical level picture that is updated whenever it is input from the upper hierarchical level picture memory 2 through the switch 8. Thus, after all pixels of the upper hierarchical picture stored in the upper hierarchical level picture memory 2 are designated to a considered pixel, the optimum upper hierarchical level picture of which all pixels have been optimized are stored to the frame memory 9.

The optimum upper hierarchical level picture stored in the frame memory 9 is output to a decoder (that will be described later with reference to FIG. 13) at a predetermined timing along with the predictive coefficient taps for the nine modes. To control the process of the encoder (that will be described later), a controlling portion 10 is disposed. The controlling portion 10 receives output data of the error calculating circuit 7 and generates a signal for controlling the switch 8. In addition, the controlling portion 10 supplies various control signals to each block so as to perform the process of the encoder.

Figure 9:
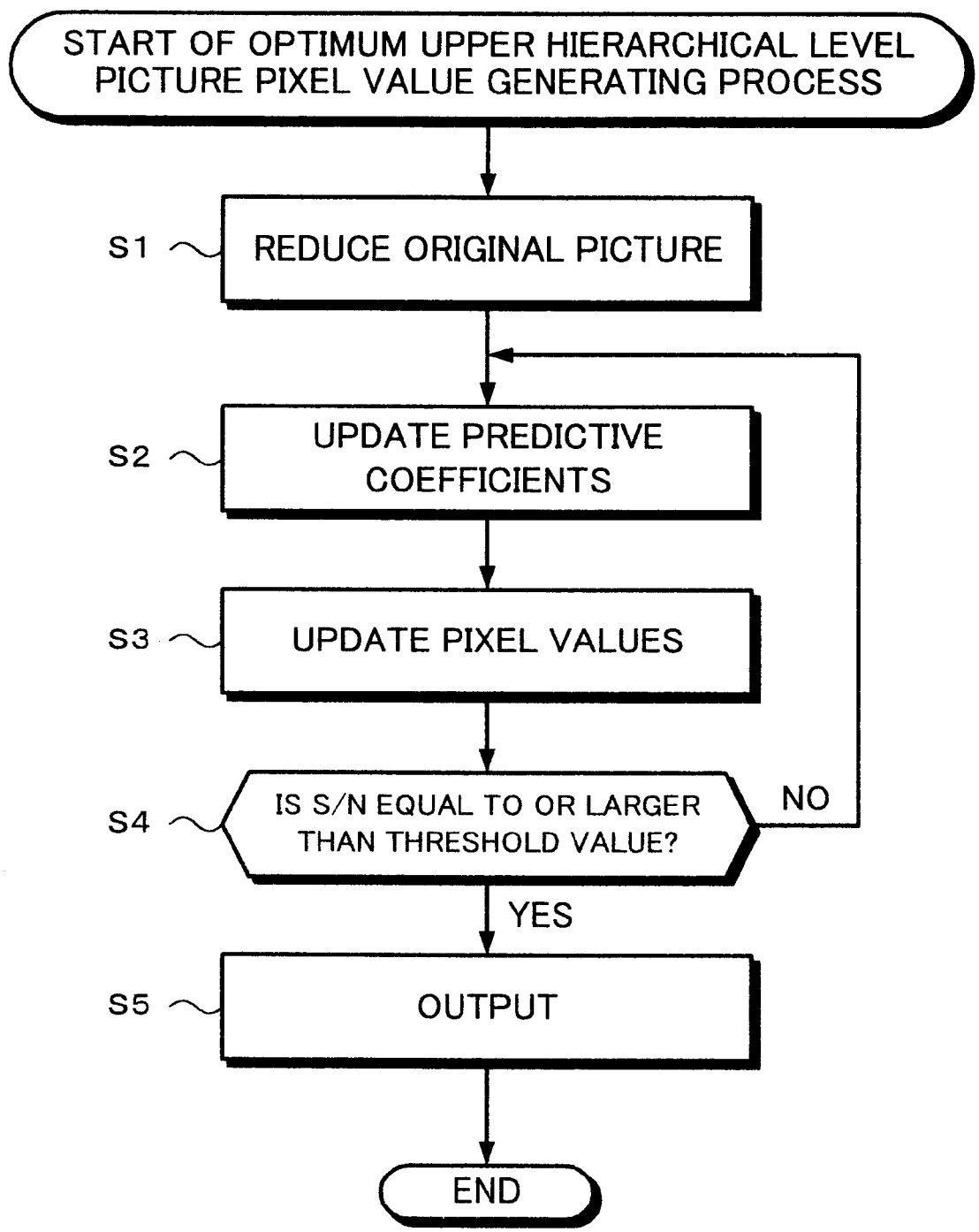
FIG. 9 is a flow chart for explaining an outline of an optimum pixel value generating process of the encoder shown in FIG. 4.

Next, with reference to a flow chart shown in FIG. 9, an outline of the optimum upper hierarchical level pixel value generating process of the encoder will be descried. The process that follows will be described with reference to the structure shown in FIG. 4. However, it should be noted that the process may be accomplished by other than hardware shown in FIG. 4. Alternatively, the process may be accomplished by the CPU 114 corresponding to a software program stored in the ROM 112 shown in FIG. 3. In this case, each step of the process will be accomplished under the control of the CPU 114 corresponding to the software program.

At step S1, the picture reducing circuit 1 divides a supplied original picture (high resolution picture) into blocks each of which is composed of (3×3) pixels, generates an initial upper hierarchical level picture of which the average value of pixel values of nine pixels of each block is designated to the pixel value of a pixel at the center of the block of the upper hierarchical level picture (low resolution picture), and stores the initial upper hierarchical level picture to the upper hierarchical level picture memory 2.

The predictive tap obtaining circuit 3 successively designates each pixel of the upper hierarchical level picture stored in the upper hierarchical level picture memory 2 to a considered pixel and obtains pixel values of (7×7) pixels that surround the considered pixel from the upper hierarchical level picture memory 2. The predictive tap obtaining circuit 3 supplies the pixel values of the (3×3) pixels that surround the considered pixel of the obtained 49 pixel values to the predictive coefficient calculating circuit 4. On the other hand, the predictive tap obtaining circuit 3 supplies all the obtained pixel values to the pixel value updating circuit 5. In addition, the predictive tap obtaining circuit 3 supplies the pixel values of 40 (=49−9) pixels excluding the (3×3) pixels that surround the considered pixel of the obtained 49 pixel values to the mapping circuit 6. For example, when the predictive tap obtaining circuit 3 designates the pixel x5 shown in FIG. 5 to the considered pixel, the predictive tap obtaining circuit 3 supplies the pixel values of a predictive coefficient tap of (3×3) pixels (pixels x1 to 9) that surround the considered pixel x5 to the predictive coefficient calculating circuit 4. The predictive tap obtaining circuit 3 supplies the pixel values of (7×7) pixels that surround the considered pixel x5 to the pixel value updating circuit 5. The predictive tap obtaining circuit 3 supplies the pixel values of 40 (=49−9) pixels excluding (3×3) pixels that surround the considered pixel x5 from the (7×7) pixels that surround the considered pixel x5 to the mapping circuit 6.

At step S2, the predictive coefficient calculating circuit 4 generates an observation equation with a predictive tap of (3×3) pixels that surrounds a considered pixel supplied from the predictive tap obtaining circuit 3 as learning data (student data) and pixels of the original picture corresponding thereto as teacher data, solves the observation equation using the method of least squares, obtains predictive coefficient taps for nine modes, and supplies the obtained predictive coefficient taps to the pixel value updating circuit 5 and the mapping circuit 6. When predictive coefficients are obtained, an observation equation for all pixels of the screen is formed.

At step S3, the normal equation generating circuit 11 of the pixel value updating circuit 5 generates an observation equation expressed as formula (13) with predictive coefficient taps that are input from the predictive coefficient calculating circuit 4, the pixel values of (7×7) pixels that surround a considered pixel that are supplied from the predictive tap obtaining circuit 3, and the pixel values of the original picture corresponding thereto and outputs the generated observation equation to the pixel value deciding circuit 12. The pixel value deciding circuit 12 solves the input observation equation using the method of least squares and outputs the pixel values of the obtained update pixel value tap to the upper hierarchical level picture memory 2 and the mapping circuit 6.

The upper hierarchical level picture memory 2 receives the pixel values of pixels of the upper hierarchical level picture from the pixel value updating circuit 5 and updates the stored pixel values of the upper hierarchical level picture with the pixel values that are input from the pixel value updating circuit 5. The mapping circuit 6 calculates liner combinations of the pixel values of an update pixel value tap that are input from the pixel value updating circuit 5, the pixel values of 40 pixels excluding (3×3) pixels that surround a considered pixel from (7×7) pixels that surround the considered pixel that are input from the predictive tap obtaining circuit 3, and predictive taps for nine modes that are input from the predictive coefficient calculating circuit 4 and partly local-decodes the pixels values of pixels of the lower hierarchical level picture. The mapping circuit 6 supplies the local-decoded pixel values of the lower hierarchical level picture to the error calculating circuit 7.

At step S4, the error calculating circuit 7 calculates S/N of the pixel values of pixels of the lower hierarchical level picture that are local-decoded by the mapping circuit 6 and the pixel values of pixels of the original picture corresponding thereto and determines whether or not S/N is equal to or larger than a predetermined threshold value. When S/N is smaller than the predetermined threshold value (namely, the determined result at step S4 is No), a loop from step S2 to step S4 is repeated. When S/N is equal to or larger than the predetermined threshold value (namely, the determined result at step S4 is Yes), the flow advances to step S5.

At step 5, the switch 8 is turned on under the control of the error calculating circuit 7. The partially optimized upper hierarchical level picture is output from the upper hierarchical level picture memory 2 to the frame memory 9 through the switch 8.

When the optimum upper hierarchical level picture pixel value generating process is performed for all pixels of the upper hierarchical level picture stored in the upper hierarchical level picture memory 2, an optimum upper hierarchical level picture of which all pixels are optimized is stored to the frame memory 9. The stored optimum upper hierarchical level picture is output at a predetermined timing to the decoder along with the predictive coefficient taps for the nine modes.

Figure 10:
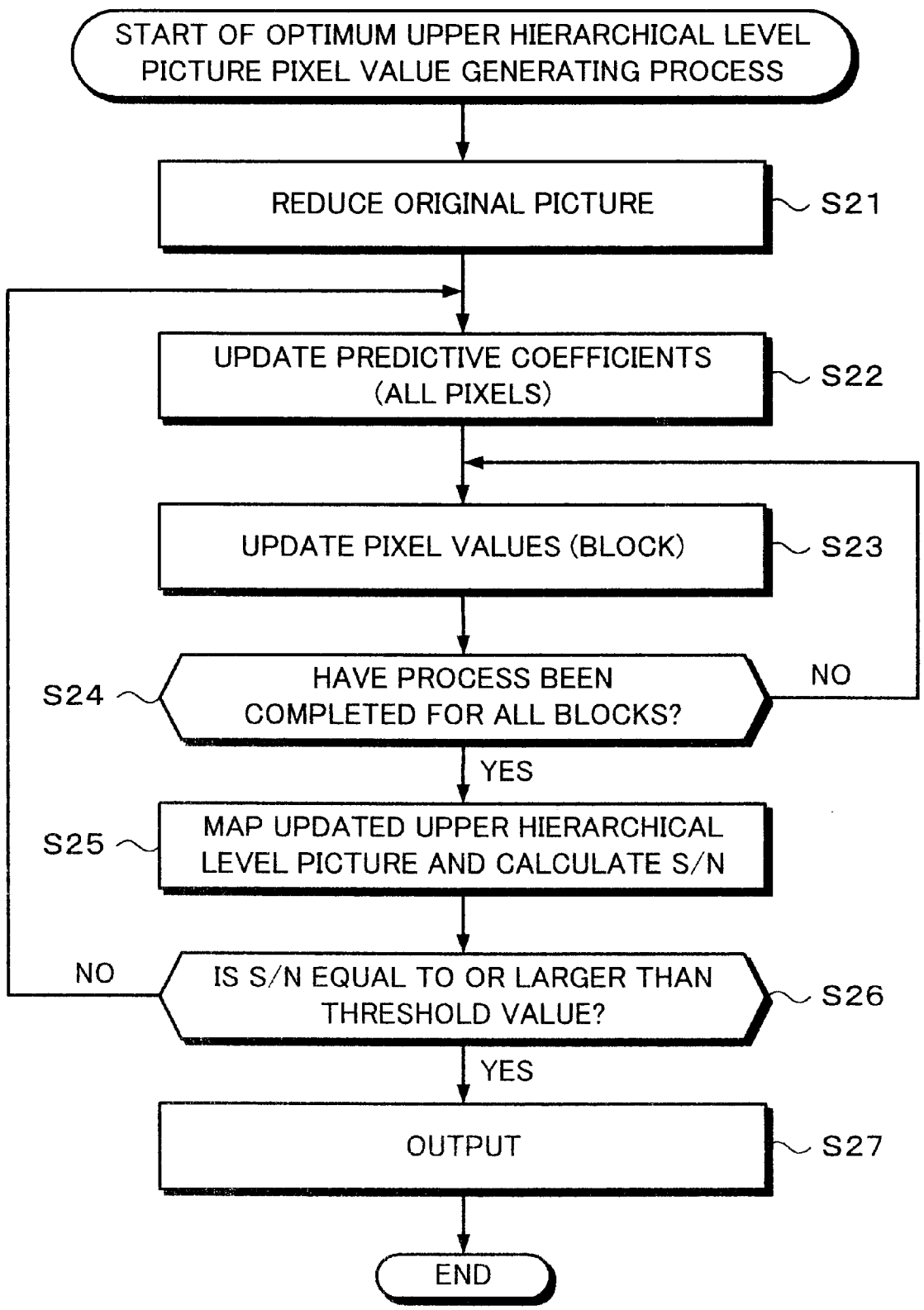
FIG. 10 is a flow chart for explaining an example of the optimum pixel value generating process of the encoder shown in FIG. 4.

Next, several examples of the process of the encoder will be described. FIG. 10 is a flow chart showing a first example of the process of the encoder. In the first example, when predictive coefficients are updated, individual pixels are updated.

At step S21, the encoder reduces an original picture so as to generate an upper hierarchical level picture. The encoder updates predictive coefficients of all pixels of the screen (at step S22). At step S23, the encoder updates the pixel values of each block (equivalent to an update pixel value tap). At step S24, the encoder determines whether or not the process has been completed for all blocks. When the process has not been completed for all the blocks (namely, the determined result at step S24 is No), the flow returns to step S22. At step S22, the process is repeated.

At step S24, when the process has been completed, for all blocks (namely, the determined result at step S24 is Yes), the encoder maps (local-decodes) an updated upper hierarchical level picture and calculates S/N that represents errors with the lower hierarchical level picture (at step S25). At step S26, the encoder determines whether or not S/N is equal to or larger than a predetermined threshold value. When S/N is equal to or larger than the predetermined threshold value (namely, the determined result at step S26 is Yes), the encoder outputs the updated upper hierarchical level picture to the frame memory 9. In addition, the encoder outputs predictive coefficients (at step S27). On the other hand, when S/N is smaller than the predetermined threshold value (namely, the determined result at step S26 is No), the flow returns to step S22. Thus, a loop starting from step S22 is repeated.

Figure 11:
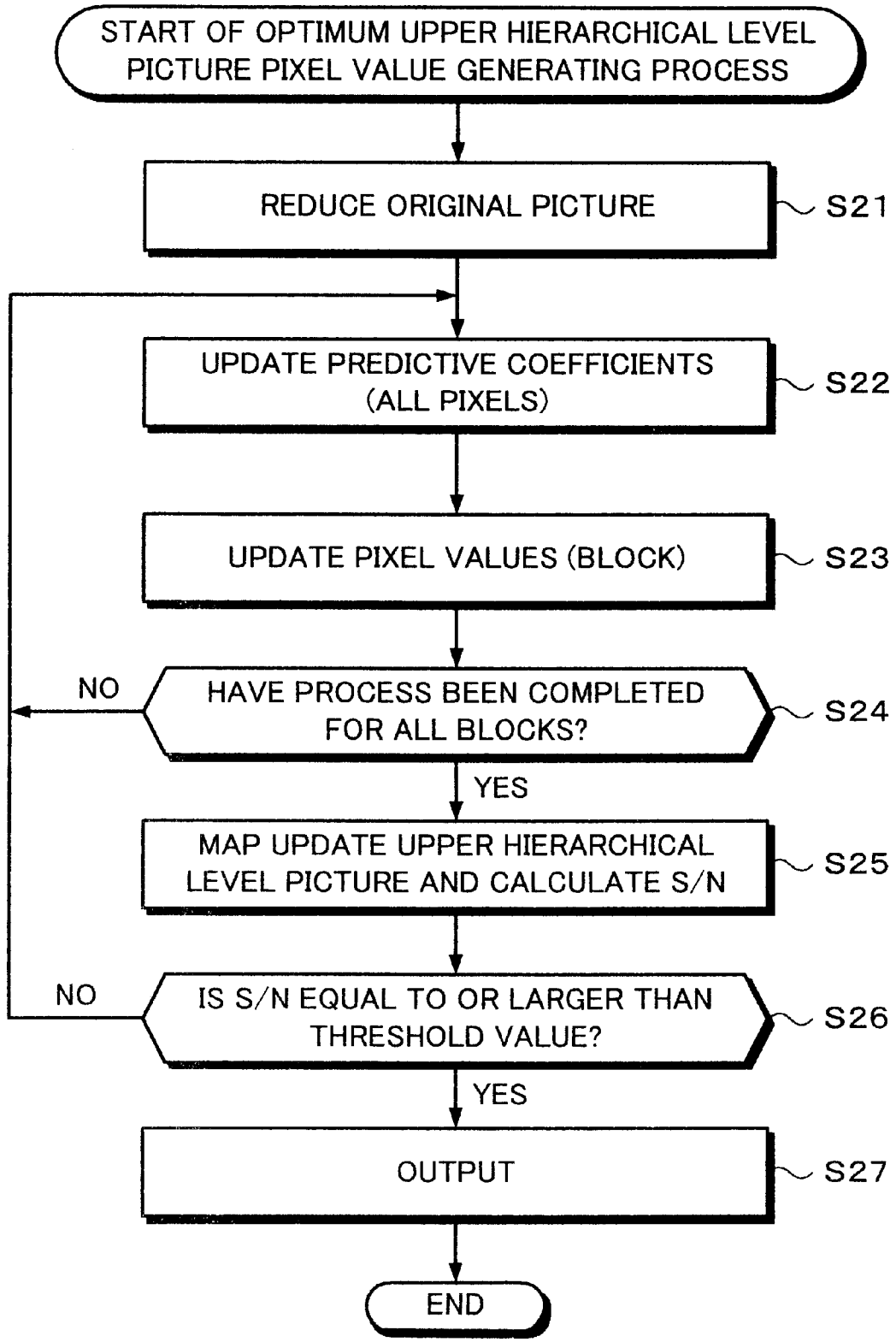
FIG. 11 is a flow chart for explaining another example of the optimum pixel value generating process of the encoder shown in FIG. 4.

FIG. 11 is a flow chart showing a second example of the process of the encoder. In the second example, when predictive coefficients are updated, pixel values of only one block are updated unlike with the first example shown in FIG. 10. Thus, although the pixel values of all blocks have not been updated, the flow returns to step S22, skipping step S23. In other words, predictive coefficients of the full screen are performed at step S22 without updating pixel values.

Figure 12:
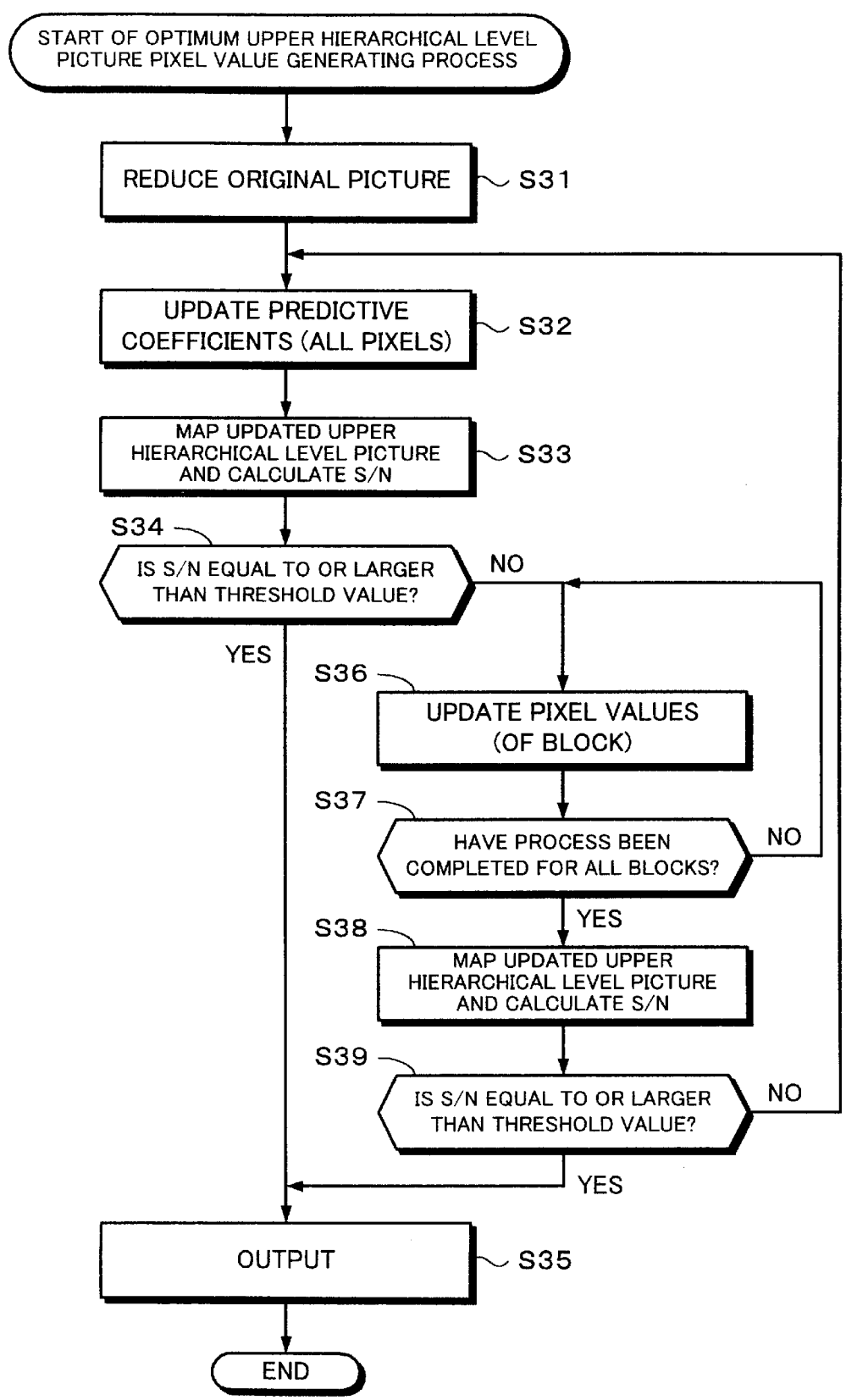
FIG. 12 is a flow chart for explaining another example of the optimum pixel value generating process of the encoder shown in FIG. 4.

FIG. 12 is a flow chart showing a third example of the process of the encoder. In the third example, updated pixel values are evaluated after predictive coefficients are updated and after pixel values are updated.

In FIG. 12, after an original picture is reduced (at step S31), predictive coefficients of all pixels are updated (at step S32). The encoder maps an updated upper hierarchical level picture and calculates S/N that represents errors with a lower hierarchical level picture (at step S33). At step S34, the encoder determines whether or not S/N is equal to or larger than a predetermined threshold value. When S/N is equal to or larger than the predetermined threshold value (namely, the determined result at step S34 is Yes), the encoder outputs an updated upper hierarchical level picture to the frame memory 9 and outputs predictive coefficients (at step S35).

When S/N is smaller than the threshold value (namely, the determined result at step S34 is No), the flow advances to step S36. At step S36, the encoder updates the pixel values of each block. At step S37, the encoder determines whether or not the process has been completed for all blocks. When the process has not been completed for all the blocks (namely, the determined result at step S37 is No), the flow advances to step S36. At step S36, the encoder repeats the process.

At step S37, the encoder determines whether or not the pixel values of all blocks have been updated. When the pixel values of all blocks have been updated (namely, the determined result at step S37 is Yes), the encoder maps an updated upper hierarchical level picture and calculates S/N that represents errors with a lower hierarchical level picture (at step S38). At step S39, the encoder determines whether or not S/N is equal to or larger than a predetermined threshold value. When S/N is equal to or larger than the predetermined threshold value (namely, the determined result at step S39 is Yes), the encoder outputs an updated upper hierarchical level picture to the frame memory 9. In addition, the encoder outputs predictive coefficients (at step S35). When S/N is smaller than the predetermined threshold value (namely, the determined result at step S39 is No), the flow returns to step S32. Thus, the process after step S32 is repeated.

According to the above described embodiment of the present invention, both predictive coefficients and pixel values of pixels of an upper hierarchical level picture are optimized. However, according to the present invention, by pre-obtaining predictive coefficients, only pixels values can be optimized. In this case, predictive coefficients are pre-generated by performing the same process as the predictive coefficient generating process of the encoder using a digital picture for deciding coefficients. In addition, since the predictive coefficients are shared by the encoder and the decoder, it is not necessary to record the predictive coefficients to a record medium or to transmit them to another unit.

Figure 13:
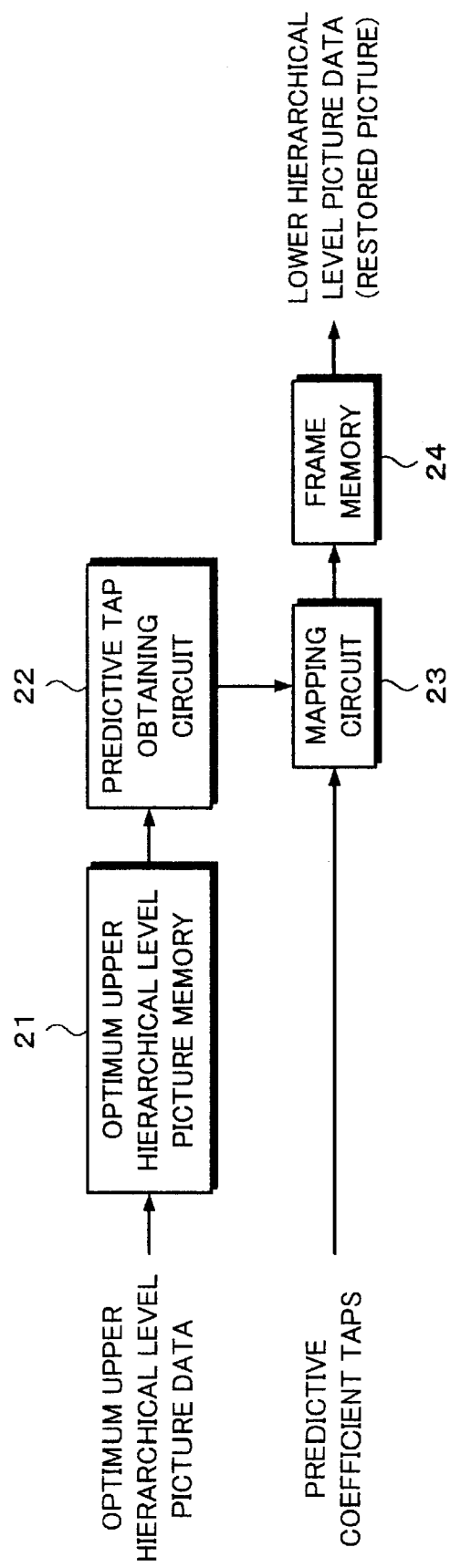
FIG. 13 is a block diagram showing an example of the structure of a decoder that restores an original picture using an optimum upper hierarchical level picture generated by the encoder shown in FIG. 4.

Next, with reference to FIG. 13, an example of the structure of the decoder that restores an original picture from an optimum upper hierarchical level picture that is output from the encoder will be described. In the decoder, the optimum upper hierarchical level picture that is input from the encoder is stored to an optimum upper hierarchical level picture memory 21. Predictive coefficient taps for nine modes are supplied to a mapping circuit 23.

The predictive tap obtaining circuit 22 successively designates each pixel of the optimum upper hierarchical. level picture stored in the optimum upper hierarchical level picture memory 21 to a considered pixel, obtains a predictive tap of (3×3) pixels that surround the considered pixel from the optimum upper hierarchical level picture memory 21, and outputs the predictive map to the mapping circuit 23.

The mapping circuit 23 calculates linear combinations of pixel values of nine pixels as a predictive tap that are input from the predictive tap obtaining circuit 22 and the predictive coefficient taps for nine modes that are supplied from the encoder so as to predict the pixel values of (3×3) pixels that surround the pixel of the lower hierarchical level picture corresponding to the considered pixel (namely, restore pixels of the original picture). The mapping circuit 23 outputs the predicted pixel values of the (3×3) pixels of the lower hierarchical level picture to the frame memory 24. The pixel values of the pixels of the lower hierarchical level picture stored in the frame memory 4 are output frame by frame at a predetermined timing to a display unit or the like (not shown).

Next, with reference to a flow chart shown in FIG. 14, an original picture restoring process of the decoder will be described. The original picture restoring process is started after an optimum upper hierarchical level picture generated by the encoder is stored to the optimum upper hierarchical level picture memory 21 and predictive coefficient taps for nine modes are supplied to the mapping circuit 23.

At step S11, the predictive tap obtaining circuit 22 designates one of pixels of the optimum upper hierarchical level picture stored in the optimum upper hierarchical level picture memory 21 to a considered pixel. At step S12, the predictive tap obtaining circuit 22 obtains a predictive tap of (3×3) pixels that surrounds the considered pixel from the optimum upper hierarchical level picture memory 21 and outputs the predictive tap to the mapping circuit 23.

At step S13, the mapping circuit 23 calculates linear combinations of the pixel values of nine pixels as the predictive tap that is input from the predictive tap obtaining circuit 22 and the predictive coefficient taps for the nine modes that are supplied from the encoder so as to predict the pixel values of (3×3) pixels that surround the pixel of the lower hierarchical level picture corresponding to the considered pixel (namely, to restore the original picture). The predicted pixel values of the (3×3) pixels of the lower hierarchical level picture are output to the frame memory 24 and stored.

At step S14, the predictive tap obtaining circuit 22 determines whether or not all the pixels of the optimum upper hierarchical level picture stored in the optimum upper hierarchical level picture memory 21 have been designated to a considered pixel. The loop from step S11 to S14 is repeated until all the pixels have been designated to the considered pixel. When all the pixels have been designated to the considered pixel (namely, the determined result at step S14 is Yes), the flow advances to step S15.

At step S15, the pixel values of pixels of the lower hierarchical level picture stored in the frame memory 24 are output frame by frame at a predetermined timing to a display unit or the like.

According to the embodiment of the present invention, in comparison with the conventional method, an upper hierarchical level picture of which a restored picture has higher S/N can be obtained.

As described above, according to the present invention, the pixel values of a plurality of pixels are simultaneously optimized block by block. Thus, the process can be simplified. In addition, the process time can be shortened.

What is claimed is:

1. Picture data converting apparatus for converting first picture data into second picture data whose picture quality is lower than that of the first picture data comprising:
    an intermediate picture data generator for generating from said first picture data intermediate picture data whose picture quality approximates that of the second picture data;
    a store for storing the intermediate picture data;
    a block extractor for extracting from the intermediate picture data a plurality of pixel data for each block which is part of one screen;
    a predictive coefficient generator for generating predictive coefficients according to the extracted intermediate picture pixel data and the first picture data at a position corresponding to the extracted intermediate picture pixel data;
    a pixel value updater for updating the pixel values of the extracted intermediate picture pixel data according to the predictive coefficients, the intermediate picture data, and the first picture data;
    a predictive picture data generator for generating predictive picture data whose picture quality approximates that of the first picture data according to the updated pixel values of the extracted intermediate picture pixel data and the predictive coefficients;
    an error detector for detecting an error between the first picture data and the predictive picture data; and
    a controller responsive to said error for deciding whether or not the intermediate picture data is used as an output picture.

2. The picture data converting apparatus of claim 1, wherein said error detector detects an error between the first picture data for one screen and the predictive pixel data for one screen.

3. The picture data converting apparatus of claim 1, wherein said pixel value updater includes a normal equation generator for generating a normal equation according to the predictive coefficients, the intermediate picture data, and the first picture data; and a pixel value determiner for solving the normal equation to determine the updated pixel values of the extracted intermediate picture pixel data.

4. The picture data converting apparatus of claim 3, wherein said pixel value determiner solves the normal equation by using the least squares method.

5. A picture data converting method for converting first picture data into second picture data whose picture quality is lower than that of the first picture data, comprising the steps of:
    generating from said first picture data intermediate picture data whose picture quality approximates that of the second picture data;
    extracting from the intermediate picture data a plurality of pixel data for each block which is part of one screen;
    generating predictive coefficients according to the extracted intermediate picture pixel data and the first picture data at a position corresponding to the extracted intermediate picture pixel data;
    updating the pixel values of the extracted intermediate picture pixel data according to the predictive coefficients, the intermediate picture data, and the first picture data;
    generating predictive picture data whose picture quality approximates that of the first picture data according to the updated pixel values of the extracted intermediate picture pixel data and the predictive coefficients;
    detecting an error between the first picture data and the predictive picture data; and
    deciding in response to said error whether or not the intermediate picture data is used as an output picture.

6. The picture data converting method of claim 5, wherein the error is detected by detecting an error between the first picture data for one screen and the predictive pixel data for one screen.

7. The picture data converting method of claim 5, wherein the pixel values are updated by generating a normal equation according to the predictive coefficients, the intermediate picture data and the first picture data; and solving the normal equation to determine the updated pixel values of the extracted intermediate picture pixel data.

8. The picture data converting method of claim 7, wherein the normal equation is solved by using the least squares method.

9. Learning apparatus for learning pixel values of second picture data when converting first picture data into the second picture data whose picture quality is lower than that of the first picture data, comprising:

> an intermediate picture data generator for generating from said first picture data intermediate picture data whose picture quality approximates that of the second picture data;
>
> a store for storing the intermediate picture data;
>
> a block extractor for extracting from the intermediate picture data a plurality of pixel data for each block which is part of one screen;
>
> a predictive coefficient generator for generating predictive coefficients according to the extracted intermediate pixel data and the first picture pixel data and the first picture data at a position corresponding to the extracted intermediate picture pixel data;
>
> a pixel value updater for updating the pixel values of the extracted intermediate picture pixel data according to the predictive coefficients, the intermediate picture data, and the first picture data;
>
> a predictive picture data generator for generating predictive picture data whose picture quality approximates that of the first picture data according to the updated pixel values of the extracted intermediate picture pixel data and the predictive coefficients;
>
> an error detector for detecting an error between the first picture data and the predictive picture data; and
>
> a controller responsive to said error for deciding whether or not the intermediate picture data is used as an output picture.

10. A method of learning pixel values of second picture data when converting first picture data into the second picture data whose picture quality is lower than that of the first picture data, comprising the steps of:

> generating from said first picture data intermediate picture data whose picture quality approximates that of the second picture data;
>
> extracting from the intermediate picture data a plurality of pixel data for each block which is part of one screen;
>
> generating predictive coefficients according to the extracted intermediate picture pixel data and the first picture data at a position corresponding to the extracted intermediate picture pixel data;
>
> updating the pixel values of the extracted intermediate picture pixel data according to the predictive coefficients, the intermediate picture data, and the first picture data;
>
> generating predictive picture data whose picture quality approximates that of the first picture data according to the updated pixel values of the extracted intermediate picture pixel data and the predictive coefficients;
>
> detecting an error between the first picture data and the predictive picture data; and
>
> deciding in response to said error whether or not the intermediate picture data is used as an output picture.

11. A record medium on which is recorded a program for controlling a computer to convert first picture data into second picture data whose picture quality is lower than that of the first picture data, the program comprising the steps of:

> generating from said first picture data intermediate picture data whose picture quality approximates that of the second picture data;
>
> extracting from the intermediate picture data a plurality of pixel data for each block which is part of one screen;
>
> generating predictive coefficients according to the extracted intermediate picture pixel data and the first picture data at a position corresponding to the extracted intermediate picture pixel data;
>
> updating the pixel values of the extracted intermediate picture pixel data according to the predictive coefficients, the intermediate picture data, and the first picture data;
>
> generating predictive picture data whose picture quality approximates that of the first picture data according to the updated pixel values of the extracted intermediate picture pixel data and the predictive coefficients;
>
> detecting an error between the first picture data and the predictive picture data; and
>
> deciding in response to said error whether or not the intermediate picture data is use as an output picture.

* * * * *